United States Patent [19]

Yamada et al.

[11] Patent Number: 4,939,602
[45] Date of Patent: Jul. 3, 1990

[54] CASSETTE HOLDER MECHANISM

[75] Inventors: Kimichika Yamada; Hitoshi Okada; Hidenori Muramatsu; Katsuya Nozawa; Yoshihiko Goto; Hiroyuki Ohkawa, all of Tokyo, Japan

[73] Assignee: Clarion Co., Ltd., Tokyo, Japan

[21] Appl. No.: 61,054

[22] Filed: Jun. 10, 1987

[30] Foreign Application Priority Data

Jun. 18, 1986 [JP] Japan ................... 61-139970
Jun. 18, 1986 [JP] Japan ................... 61-139969
Aug. 12, 1986 [JP] Japan ............... 61-122870[U]

[51] Int. Cl.$^5$ ............................................. G11B 15/00
[52] U.S. Cl. ................................................ 360/96.5
[58] Field of Search ........................ 360/96.5, 93, 85

[56] References Cited

U.S. PATENT DOCUMENTS 4,546,396 10/1985 Schatteman .................. 360/96.5
4,583,138 4/1986 Imazaike ........................ 360/85

Primary Examiner—John H. Wolff
Attorney, Agent, or Firm—Flynn, Thiel, Boutell & Tanis

[57] ABSTRACT

A cassette holder mechanism includes right and left cassette holders independently supporting opposite side marginal portions of a cassette and having guide rollers inserted in guide holes of right and left chassis side walls. Each cassette holder includes a gap at its side portion which engages guide shafts attached to each chassis side wall.

11 Claims, 3 Drawing Sheets

CASSETTE HOLDER MECHANISM

FIELD OF THE INVENTION

This invention relates to a cassette holder mechanism for holding a tape cassette at an interior position and moving it to a predetermined play position in a tape player, video deck or other magnetic recording apparatus.

BACKGROUND OF THE INVENTION

As shown in FIG. 4, a prior art cassette holder in a magnetic recording apparatus has a unitary box-like configuration defined by a bottom plate 11 supporting the entire bottom surface of a cassette C, right and left lateral walls 12—12 and right and left upper plates 13—13 partly covering the upper surface of the cassette C.

In the unitary box-shaped cassette holder 10, however, the bottom plate 11, when dropping the cassette C to a play position, hits or contacts a member on the surface of the tape player such as reel bases or their control driving members, unless the members are located otherwise. In this respect, the prior art cassette holder has a drawback that a certain restriction is imposed to placement of the members and that the height of the recording apparatus is increased if the members are located at lower positions away from the bottom plate 11 of the cassette holder.

Beside this, the box-shaped cassette holder 10 is often deformed by a downward load on it, or a horizontal distortion as shown in FIG. 5 sometimes occurs due to a difference between moving timings of its right and left portions. In these cases, the cassette holder 10 is caught by right and left chassis side walls 14—14 and cannot move smoothly.

Further, smooth movement of the prior art cassette holder is not ensured unless its width is accurate with respect to the distance between the right and left chassis side walls 14—14. This causes a difficulty or nervous attention in its manufacturing process.

OBJECT OF THE INVENTION

It is therefore an object of the invention to provide a cassette holder mechanism which contributes to a reduction in height of the magnetic recording apparatus and ensures a smooth movement of the cassette holder without hitting or engaging members at right and left portions thereof.

SUMMARY OF THE INVENTION

According to the invention, there is provided a cassette holder mechanism comprising:
  right and left cassette holders configured to support opposite side marginal portions of a cassette;
  right and left chassis side walls supporting said right and left cassette holders independently, interposing a space between the cassette holders; and
  a guide means guiding said right and left cassette holders horizontally and vertically with respect to said right and left chassis side walls.

With this arrangement, the entire cassette holder assembly consists of right and left holders, defining a space between them. Therefore, members under the cassette holders may be placed to extend into the space, and this contributes to a reduction in height of the magnetic recording apparatus to this extent.

Further, the use separate of the cassette holders eliminates a prior art drawback that the cassette holder deformed by a load or a twisting force hits or engages the right and left chassis walls and fails to move in a straight, balanced fashion.

Additionally, this arrangement does not require measurement coincidence of the width of the cassette holder with respect to the distance between the right and left chassis walls, and hence does not require severe working accuracy of the cassette holder.

DETAILED DESCRIPTION

The invention is described below in detail, referring to an embodiment illustrated in FIGS. 1 and 2.

Figure 1:
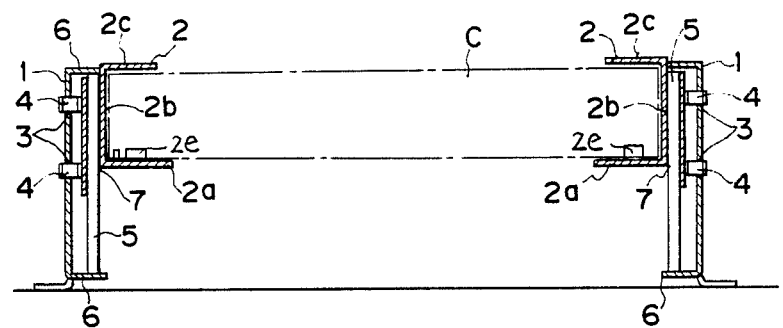
FIG. 1 is a cross-sectional view of a cassette holder mechanism embodying the invention.

FIG. 1 is a front elevation of a cassette holder mechanism embodying the invention. Reference numeral 1 denotes right and left chassis side walls supporting right and left cassette holders 2 independently inside them. Each cassette holder 2 is a channel-shaped member defined by a bottom plate 2a supporting the bottom of a cassette C, a side wall 2b guiding a side surface of the cassette C and an upper plate 2c fitting the upper surface of the cassette C. The side wall 2b of the cassette holder 2 extends along the chassis side wall 1. The right and left cassette holders merely support opposite side marginal portions of the cassette C, and a large space exposing a large part of the bottom surface of the cassette C is provided between the right and left cassette holders 2.

Between each chassis side wall 1 and each cassette holder 2 is provided a guide means supporting the cassette holder 2 for back and forth movement relative to the chassis side wall 1.

Figure 2:
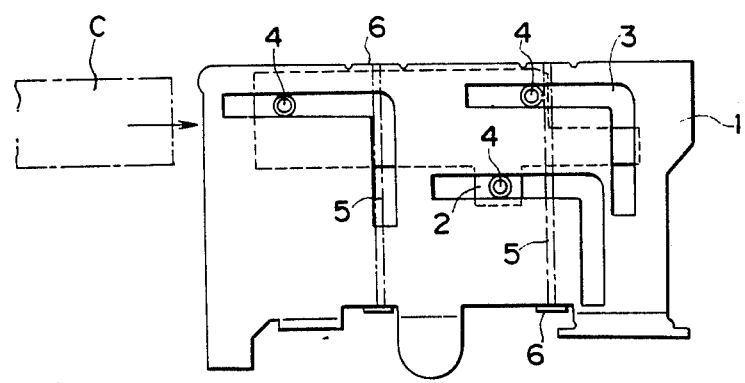
FIG. 2 is a side elevation of the same mechanism.
Figure 3:
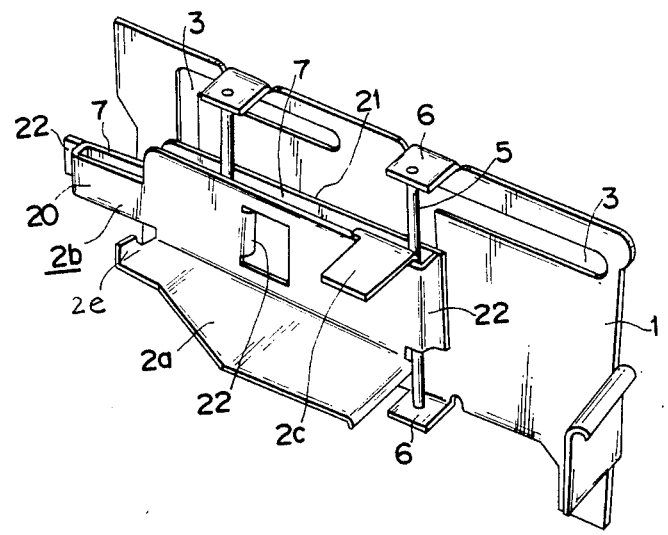
FIG. 3 is a perspective view of a left-hand cassette holder of the same mechanism taken from the interior thereof.

The embodiment employs a guide means preventing displacement of the cassette holders 2 in the back and forth direction and in the up and down direction as shown in FIG. 2 in which each chassis side wall 1 is provided with three L-shaped guide holes 3 engaging guide rollers 4 formed on the outer surface of the side wall 2b of each cassette holder 2. Each L-shapped guide hole 3 includes a horizontal portion extending toward the rear end of the chassis side wall, i.e. the rear end of the magnetic recording apparatus, and a vertical portion downwardly extending from the rear end of the horizontal portion.

Further, the embodiment employs a guide means regulating the position in the width direction. Namely, two guide shafts 5 in back and forth alignment extend vertically inside each chassis side wall, and they are accepted in a slotlike opening 7 of each cassette holder 2. More specifically, each chassis side wall 1 has support pieces 6 projecting inwardly from upper and lower margins thereof, and they support upper and lower end portions of the guide shafts 5. On the other hand, the embodiment employs a double arrangement of the cassette holder 2 in which the side wall 2b consists of an inner plate 20 and an outer plate 21 which define the opening 7 between them to accept the guide shafts 5 slidably.

With this arrangement, the cassette holder mechanism operates as follows.

When the cassette C is inserted in the right and left cassette holder 2 from the front end of the apparatus, the distal end of the cassette C engages stoppers 2e provided at rear portions of the bottom plates 2a of the cassette holders 2 at a certain insertion amount, and the cassette C thereafter moves together with the right and left cassette holders down the magnetic recording apparatus. In this movement, vertical displacement of the right and left cassette holders 2 is prevented by the guide rollers 4 on the side walls 2b which move in the horizontal portions of the L-shaped guide holes 3 of the chassis side walls 1. At the same time, displacement of the cassette holders 2 in their width direction is prevented by the guide shafts 5 in the opening 7 engaging the double-plate side walls 2b. When the right and left cassette holders 2 reach the rear ends of the chassis side walls 1, they subsequently drop, with their guide rollers 4 guided by the vertical portions of the L-shaped guide holes 3, and bring the cassette C on a play position on reel bases.

As described, the cassette holder mechanism according to the embodiment is configured to support the right and left side marginal portions of the cassette C by separate cassette holders 2. Therefore, an entirely extending bottom plate in a prior art box-shaped cassette holder does not exist in a central portion. Due to this, it is not necessary to avoid right and left reels, their driving gears, links or other members when the cassette holders drop to the play position on the reel bases. This not only leads to a simple bottom arrangement of the cassette holders, but also eliminates severe restriction to placement of various members associated with reel bases and permits vertical dimensional reduction of the entire apparatus to the extent of the base plate.

Further, since the cassette holders 2 are separate members, possible twist or distortion of the cassette holders caused by a load is absorbed in the space between the right and left cassette holders, their distance in the width direction is never expanded. Therefore, the cassette holders never hit or engage the right and left chassis side plates, and the cassette is transported in a smooth fashion.

Additionally, since the space between the right and left cassette holders absorbs a possible measurement error of the cassette holders or chassis side walls, it is not necessary to meet the distance between the right and left chassis side walls with the width of the prior art unitary cassette holder. Therefore, severe measurement accuracy is not required in the manufacturing process of the cassette holders.

To mount the cassette holders 2 to the chassis side walls 1, the guide rollers 4 of the cassette holders 2 are first inserted in the guide holes 3 of the chassis side walls 1. Subsequently, the shafts 5 are inserted in the openings 7 of the cassette holders 2, and their upper and lower end portions are engaged by the support pieces 6 at upper and lower margins of the chassis side walls 1. In this configuration, the cassette holders 2 are reliably supported inside the chassis side walls 1.

Since two shafts 5 inserted in the opening 7 of the side wall 2b of each cassette holder 2 support the cassette holder 2 with respect to the chassis side wall 1 throughout the entire width of the cassette holder 2, more reliable support is expected.

Further, since the shafts 5 form line contacts with the inner plate 20 and the outer plate 21 of the cassette holder 2, frictional resistance is smaller than that produced between a flange of a guide roller and a chassis side wall in the prior art mechanism. Therefore, the energy for driving the cassette holders may be decreased.

Additionally, since the mounting operation of the cassette holders 2 with respect to the chassis side walls 1 is simplified, the manufacturing process of the mechanism is significantly improved.

Figure 6:
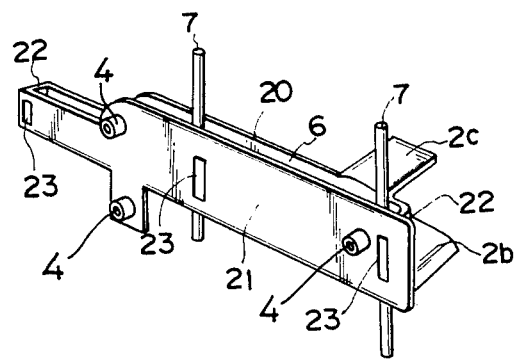
FIG. 6 is a perspective view of the cassette holder of FIG. 3 taken from the exterior thereof.
Figure 4:
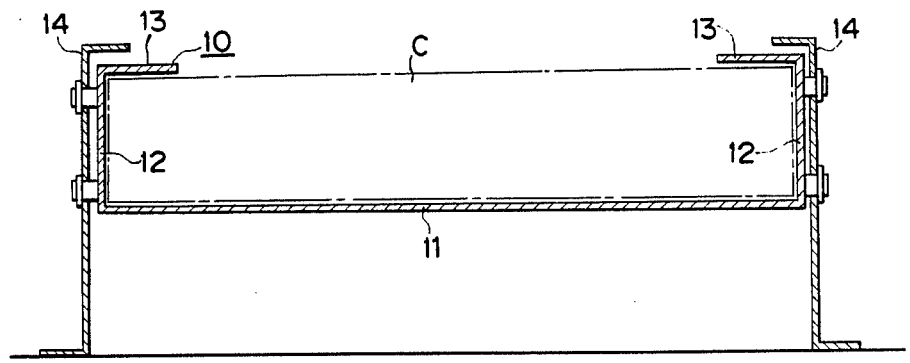
FIG. 4 is a front elevation of a prior art cassette holder mechanism.
Figure 5:
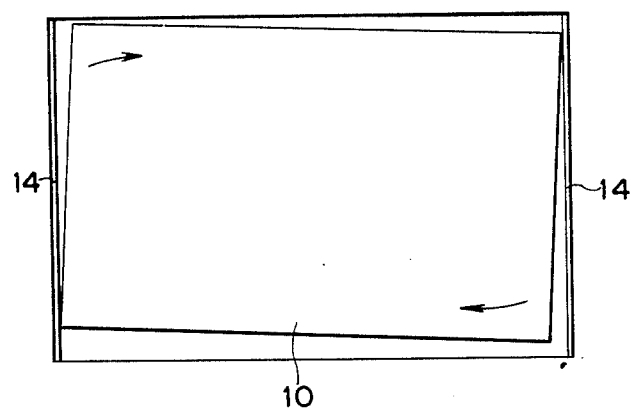
FIG. 5 is a plan view of the prior art mechanism showing its drawback.

As shown in FIG. 6, the outer plate 21 may be united to the inner plate 20 by providing bent pieces 22 at front and rear ends and at a central portion of the inner plate 20 and securing their distal ends in insertion holes 23 formed in the outer plate 21.

In this embodiment, the entire body of each cassette holder is made by sheet metal working. Therefore, the bottom plate and the stopper can be formed in a unitary body with the inner plate 20, and this makes its manufacturing process easier than that of a prior art molded cassette holder including a separate bottom plate fixed thereto. Further, the use of the sheet metal improves the strength of the cassette holders. Particularly, the double-plate arrangement of the side wall consisting of the inner and outer plates and the bent pieces 22 serving as ribs against the thickness direction of the inner plate improve the strength of the side plate against a bending force regardless of presence of the opening 7 therein.

Since the basic feature of the invention is the use of right and left, separate cassette holders, any other known technologies may be used or combined for arrangements of the chassis side walls and guide means.

For example, the illustrated guide means combining the gap 7 and the guide shafts 5 may be replaced by a flange provided at the distal end of a guide roller on the cassette holder side wall which flange engages an edge of a guide hole of the chassis side wall to positional regulation in the width direction of the cassette holder.

Further, the invention may be used not only in the illustrated cassette holder movable in back and forth direction and in up and down direction but also in a cassette holder movable exclusively in up and down direction as used in prior art audio tape players.

As described above, although the invention employs a very simple arrangement in which right and left separate cassette holders are supported independently by right and left chassis side walls to provide a space between the cassette holders where no bottom plate exists, it gives various advantages such as dimensional reduction in height of the entire magnetic recording apparatus, smooth cassette loading and ejection and easier manufacturing process.

What is claimed is:

1. A cassette holder mechanism, comprising:
spaced, vertically extending first and second chassis side plates each having therein a plurality of elongate guide holes, each said guide hole having first and second portions respectively extending in horizontal and vertical directions;
a respective set of vertically extending shafts fixedly supported adjacent each said chassis side plate on a side thereof nearest the other of said chassis side plates; and
spaced, physically separate first and second cassette holders each having a guide opening which slidably receives a respective said set of shafts and each having guide means cooperable with said guide holes in a respective said chassis side plate to guide movement thereof along said guide holes, and each said cassette holder further including a side surface portion, a bottom surface portion and an upper surface portion respectively engageable with side, bottom and top surface portions at a respective end of a cassette to support and position the cassette.

2. A cassette holder mechanism according to claim 1, wherein said side surface portion and said bottom surface portion of each said cassette holder are respectively provided on a side plate portion and a bottom plate portion of a single metal plate which is bent in the shape of the letter L, each said cassette holder including an outer surface plate spaced from and disposed on a side of said side plate portion thereof remote from the other of said cassette holders, said guide opening being the region between said side plate portion and said outer surface plate, at least one of said side plate portion and said outer surface plate having bent portions which extend to and are secured to the other thereof.

3. A cassette holder mechanism according to claim 1, wherein said shafts of each said set are fixedly supported on a respective one of said right and left chassis side plates.

4. A cassette holder mechanism according to claim 1, wherein each said guide means includes a plurality of guide rollers rotatably supported on a respective one of said cassette holders and disposed within a respective one of said guide holes.

5. A cassette holder mechanism, comprising: first and second cassette holder parts which are physically separate, which are spaced from each other in one direction by a predetermined distance, and which each have means for removably receiving a respective end portion of a tape cassette; and first and second means each independently supporting a respective said cassette holder part for movement from a first position to a second position, and for maintaining substantially said predetermined distance between said cassette parts when said cassette parts move simultaneously from said first positions thereof to said second positions thereof.

6. A cassette holder mechanism according to claim 5, wherein said first and second means include means for causing each said cassette holder part to move from its first position to its second position through a path of travel passing through a third position, each said cassette holder part moving from its first position to its third position in a second direction substantially perpendicular to said one direction and moving from its third position to its second position in a third direction substantially perpendicular to both said one direction and said second direction.

7. A cassette holder mechanism according to claim 6, wherein said first and second means respectively include first and second stationary chassis side members which are spaced and which each have therein an L-shaped guide hole having two portions respectively extending in said second and third directions, and respectively include said first and second cassette holder parts each having thereof a guide part which is movably received in said L-shaped guide hole of a respective said chassis side member.

8. A cassette holder mechanism according to claim 7, wherein said first and second means each include a stationary shaft extending approximately in said third direction and disposed between said chassis side members adjacent a respective one of said chassis side members, and include each said cassette holder part having a slotlike opening which is provided therethrough in said third direction, which slidably receives a respective said shaft, which is elongated in said second direction, and which has a width in said one direction slightly greater than the cross sectional dimension in said one direction of said shaft extending therethrough.

9. A cassette holder according to claim 8, wherein said first and second means each include a stationary further shaft which is substantially parallel to and spaced in said second direction from said first-mentioned shaft thereof, each said further shaft being slidably received in said slotlike opening in a respective said cassette holder part.

10. A cassette holder mechanism according to claim 9, wherein said first and second means include each said chassis side member having therein a plurality of said L-shaped guide holes, and include each said cassette holder part having thereon a plurality of said guide parts which are each movably disposed in a respective said guide hole.

11. A cassette holder mechanism according to claim 10, wherein each of said guide parts is a guide roller supported for rotation about an axis extending approximately parallel to said one direction.

* * * * *